(12) United States Patent
Iida et al.

(10) Patent No.: US 10,150,820 B2
(45) Date of Patent: Dec. 11, 2018

(54) PRODUCTION METHOD FOR POLYVINYLIDENE FLUORIDE AQUEOUS DISPERSION LIQUID, AND POLYVINYLIDENE FLUORIDE AQUEOUS DISPERSION LIQUID

(71) Applicant: DAIKIN INDUSTRIES, LTD., Osaka-shi, Osaka (JP)

(72) Inventors: Mayumi Iida, Settsu (JP); Yasuhiro Nakano, Settsu (JP); Katsuhiko Imoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 97 days.

(21) Appl. No.: 14/758,034

(22) PCT Filed: Jan. 6, 2014

(86) PCT No.: PCT/JP2014/050025
§ 371 (c)(1),
(2) Date: Jun. 26, 2015

(87) PCT Pub. No.: WO2014/104416
PCT Pub. Date: Jul. 3, 2014

(65) Prior Publication Data
US 2015/0337157 A1    Nov. 26, 2015

(30) Foreign Application Priority Data
Dec. 28, 2012 (JP) ................................ 2012-287794

(51) Int. Cl.
| C08F 2/26 | (2006.01) |
| C08F 14/22 | (2006.01) |
| C09D 127/16 | (2006.01) |
| C09D 7/63 | (2018.01) |
| C08K 5/42 | (2006.01) |
| C08K 5/17 | (2006.01) |

(52) U.S. Cl.
CPC ............... C08F 2/26 (2013.01); C08F 14/22 (2013.01); C09D 7/63 (2018.01); C09D 127/16 (2013.01); C08K 5/17 (2013.01); C08K 5/42 (2013.01)

(58) Field of Classification Search
CPC .......... C08K 5/12; C08K 5/0016; C08K 5/06; C08K 5/10; C08K 5/103; C09D 7/1233; C09D 11/03; C09J 11/06
USPC .......................................... 106/505; 524/724
See application file for complete search history.

(56) References Cited

U.S. PATENT DOCUMENTS

| 3,598,797 | A | * | 8/1971 | Kometani et al. ....... C08F 14/22 524/233 |
| 7,012,122 | B2 | * | 3/2006 | Kappler .................. C08F 14/22 524/545 |
| 2003/0153674 | A1 | | 8/2003 | Visca et al. |
| 2005/0154104 | A1 | | 7/2005 | Malvasi et al. |
| 2006/0148973 | A1 | | 7/2006 | Malvasi et al. |
| 2007/0149733 | A1 | | 6/2007 | Otsuka et al. |
| 2008/0221244 | A1 | | 9/2008 | Sawauchi et al. |
| 2009/0105372 | A1 | | 4/2009 | Sawauchi et al. |
| 2010/0121025 | A1 | | 5/2010 | Peng et al. |
| 2010/0204345 | A1 | | 8/2010 | Yamanaka et al. |
| 2013/0079466 | A1 | | 3/2013 | Kaneumi et al. |
| 2013/0203950 | A1 | * | 8/2013 | Imahori ................. C08F 214/18 526/222 |

FOREIGN PATENT DOCUMENTS

| JP | 2003-119204 A | 4/2003 | |
| JP | 2003119204 A | * 4/2003 | |
| JP | 2003286379 A | 10/2003 | |
| JP | 2004-359870 A | 12/2004 | |
| JP | 2004359870 A | * 12/2004 | |
| JP | 2005-171250 A | 6/2005 | |
| JP | 2006-188703 A | 7/2006 | |
| JP | 2007-045970 A | 2/2007 | |
| JP | WO 2012043831 A1 | * 4/2012 | ............ C08F 214/18 |
| WO | 2005/063827 A1 | 7/2005 | |
| WO | 2006/132368 A1 | 12/2006 | |
| WO | 2007/026822 A1 | 3/2007 | |
| WO | 2009020187 A1 | 2/2009 | |
| WO | 2011/148795 A1 | 12/2011 | |
| WO | 2012/043831 A1 | 4/2012 | |
| WO | 2012/175414 A1 | 12/2012 | |

OTHER PUBLICATIONS

Machine Translation of JP2003119204 published Apr. 23, 2003.
Machine Translation of JP2004359870 published Dec. 24, 2004.
Machine Translation of JP2007045970 published Feb. 22, 2007.
Guan et al., "Fluororesin Coating Composition and Application", Chemical Industry Press, Jan. 2004, pp. 167-168. (3 pages).
Xu et al., "Aids for Macromolecule Synthesis", Chemical Industry Press, Mar. 2002, pp. 74-78. (7 pages total).

* cited by examiner

Primary Examiner — Kelechi C Egwim
(74) Attorney, Agent, or Firm — Sughrue Mion, PLLC

(57) ABSTRACT

The present invention aims to provide a production method that can produce an aqueous dispersion containing polyvinylidene fluoride with high productivity. The present invention relates to a method of producing an aqueous dispersion of polyvinylidene fluoride, including: emulsion polymerization of vinylidene fluoride in the presence of a surfactant, an organic peroxide, and water to produce an aqueous dispersion that contains polyvinylidene fluoride. The surfactant has a surface tension of 55 mN/m or smaller when added in an amount of 1000 ppm.

3 Claims, No Drawings

PRODUCTION METHOD FOR POLYVINYLIDENE FLUORIDE AQUEOUS DISPERSION LIQUID, AND POLYVINYLIDENE FLUORIDE AQUEOUS DISPERSION LIQUID

CROSS REFERENCE TO RELATED APPLICATIONS

This application is a National Stage of International Application No. PCT/JP2014/050025 filed Jan. 6, 2014, claiming priority based on Japanese Patent Application No. 2012-287794 filed Dec. 28, 2012, the contents of all of which are incorporated herein by reference in their entirety.

TECHNICAL FIELD

The present invention relates to a method of producing an aqueous dispersion of polyvinylidene fluoride and an aqueous dispersion of polyvinylidene fluoride.

BACKGROUND ART

Polyvinylidene fluoride is excellent in such properties as heat resistance and chemical resistance. It also has a large differential between the melting point and the pyrolysis temperature, and thus is easy to process. Polyvinylidene fluoride is thus used in various applications.

Known methods of producing polyvinylidene fluoride or other fluoropolymers include emulsion polymerization, suspension polymerization, solution polymerization, and bulk polymerization. The emulsion polymerization is a method that includes polymerizing fluoromonomers in the presence of a surfactant to provide an aqueous dispersion of a fluoropolymer.

The surfactants conventionally used are perfluorooctanoic acid (PFOA) and perfluorooctanesulfonic acid (PFOS), which could adversely affect the environment.

In such situation in the art, Patent Literature 1 discloses production of a fluoropolymer aqueous dispersion using a bifunctional fluorinated surfactant represented by the formula:

$$A\text{-}R_f\text{-}B \qquad (I)$$

wherein A and B are the same as or different from each other, and are each $-(O)_p CFX-COOM$ (where $M=NH_4$, an alkali metal, or H; $X=F$ or $CF_3$; p is 0 or an integer equal to 1); $R_f$ is a linear or branched perfluoroalkyl or (per)fluoropolyether chain that allows the surfactant of Formula (I) to have a number average molecular weight of 300 or 1,800, preferably 500 or 1,600, and more preferably 600 or 1,200.

Patent Literature 2 discloses production of a dispersion of a fluorinated polymer using one or more anionic surfactants having Formula (1):

$$Y'\text{-}(P^1)_n\text{—}CH(Y)\text{-}(P^2)_{n'}\text{-}Y'' \qquad (1)$$

wherein Y, Y', and Y" are each an anionic or nonionic group, but at least one of Y, Y' and Y" is an anionic group and at least one of the others of Y, Y' and Y" is a nonionic group; $P^1$ and $P^2$ are the same as or different from each other, and are each a C1 to C10, preferably C1 to C6 linear-chain or branched alkylene group that may optionally have one or more unsaturations; and n and n' are the same as or different from each other and are each 0 or 1.

Patent Literature 3 discloses production of a low molecular weight polytetrafluoroethylene by emulsion polymerization in the presence of a fluorine-containing compound represented by the following Formula (1):

$$X\text{—}(CF_2)_m\text{—}Y \qquad (1)$$

wherein X represents H or F, m represents an integer of 3 to 5, Y represents $-SO_3M$, $-SO_4M$, $-SO_3R$, $-SO_4R$, $-COOM$, $-PO_3M_2$, or $-PO_4M_2$ (M represents H, $NH_4$, or an alkali metal, R represents a C1 to C12 alkyl group) and a reactive compound that has a functional group reactable in radical polymerization and a hydrophilic group.

CITATION LIST

Patent Literature

Patent Literature 1: JP 2003-286379 A
Patent Literature 2: JP 2005-171250 A
Patent Literature 3: WO 2009/020187

SUMMARY OF INVENTION

Technical Problem

An object of the present invention is to provide a production method that can produce an aqueous dispersion containing polyvinylidene fluoride with high productivity, allows the resultant aqueous dispersion to have high dispersion stability, and further enables easy control of the crystallinity and the melting point of the resultant polyvinylidene fluoride. Another object of the present invention is to provide an aqueous dispersion that has high dispersion stability.

Solution to Problem

One aspect of the present invention is a method of producing an aqueous dispersion of polyvinylidene fluoride.

The method includes: emulsion polymerization of vinylidene fluoride in the presence of a surfactant, an organic peroxide, and water to produce an aqueous dispersion that contains polyvinylidene fluoride. The surfactant has a surface tension of 55 mN/m or smaller when added in an amount of 1000 ppm.

Preferably, in the production method, the surfactant is the surfactants represented by Formula (1):

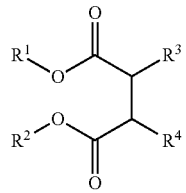

wherein $R^1$ and $R^2$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; $R^3$ represents H or $-(CH_2)_v-COOM^1$; $R^4$ represents $-SO_3M^2$ or $-(CH_2)_v-COOM^1$; v represents an integer of 0 to 3; $M^1$ and $M^2$ independently represent H, $NR_4$, or an alkali metal; and four Rs independently represent H or a C1 to C3 alkyl group, the surfactants represented by Formula (2):

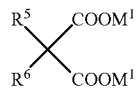

wherein $R^5$ and $R^6$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; two $M^1$s independently represent H, $NR_4$, or an alkali metal; and four Rs independently represent H or a C1 to C3 alkyl group, and the surfactants represented by Formula (3):

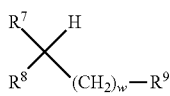

wherein $R^7$ and $R^8$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; $R^9$ represents $-SO_3M^2$ or $-COOM^1$; $M^1$ and $M^2$ independently represent H, $NR_4$, or an alkali metal; four Rs independently represent H or a C1 to C3 alkyl group; and w represents an integer of 0 to 3.

Preferably, in the production method, vinylidene fluoride alone is emulsion polymerized.

Another aspect of the present invention is an aqueous dispersion of polyvinylidene fluoride. The aqueous dispersion contains: a surfactant; water; and polyvinylidene fluoride. The surfactant is at least one selected from the group consisting of the surfactants represented by Formula (1):

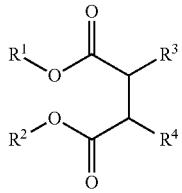

wherein $R^1$ and $R^2$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; $R^3$ represents H or $-(CH_2)_v-COOM^1$; $R^4$ represents $-SO_3M^2$ or $-(CH_2)_v-COOM^1$; v represents an integer of 0 to 3; $M^1$ and $M^2$ independently represent H, $NR_4$, or an alkali metal; and four Rs independently represent H or a C1 to C3 alkyl group, the surfactants represented by Formula (2):

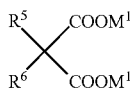

wherein $R^5$ and $R^6$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; two M's independently represent H, $NR_4$, or an alkali metal; and four Rs independently represent H or a C1 to C3 alkyl group, and the surfactants represented by Formula (3):

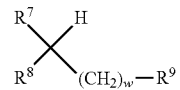

wherein $R^7$ and $R^8$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; $R^9$ represents $-SO_3M^2$ or $-COOM^1$; $M^1$ and $M^2$ independently represent H, $NR_4$, or an alkali metal; four Rs independently represent H or a C1 to C3 alkyl group; and w represents an integer of 0 to 3. The polyvinylidene fluoride includes vinylidene fluoride units derived from vinylidene fluoride. The polyvinylidene fluoride has a functional group derived from an organic peroxide at a main chain end.

Preferably, the polyvinylidene fluoride consists only of vinylidene fluoride units derived from vinylidene fluoride.

Preferably, the surfactant is represented by Formula (4):

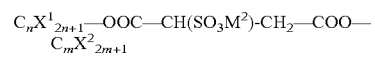

wherein n and m independently represent an integer of 3 to 10; $X^1$ and $X^2$ independently represent H, F, Cl, Br, or I; $M^2$ represents H, $NR_4$, or an alkali metal, and four Rs independently represent H or a C1 to C3 alkyl group.

Preferably, the organic peroxide is at least one selected from the group consisting of di-t-butylperoxide, di-n-propyl peroxydicarbonate, di-t-hexylperoxide, 2,5-dimethyl-2,5-di(t-butylperoxy)hexane, 2,5-dimethyl-2,5-di(t-butylperoxy)hexyne-3, and t-butyl peroxyisobutyrate.

Yet another aspect of the present invention is a coating material obtained from the aqueous dispersion of polyvinylidene fluoride of the present invention.

Yet another aspect of the present invention is a coated product that includes a coating film obtained from the aqueous dispersion of polyvinylidene fluoride of the present invention.

Advantageous Effects of Invention

The production method of the present invention can produce an aqueous dispersion containing polyvinylidene fluoride with high productivity, allows the resultant aqueous dispersion to have high dispersion stability, and further enables easy control of the crystallinity and the melting point of the resultant polyvinylidene fluoride. The aqueous dispersion of the present invention has high dispersion stability.

DESCRIPTION OF EMBODIMENTS

The present invention is described in detail below.

The production method of the present invention includes emulsion polymerization of vinylidene fluoride [VDF] to provide an aqueous dispersion that contains polyvinylidene fluoride [PVDF].

In the production method of the present invention, VDF as a radical-polymerizable monomer alone may be polymerized, or VDF and other fluorinated or non-fluorinated monomers copolymerizable with VDF may be polymerized. In view of the productivity, it is preferred that vinylidene fluoride alone is polymerized.

The production method of the present invention features polymerization of VDF in the presence of a surfactant that has a surface tension of 55 mN/m or smaller when added in an amount of 1000 ppm, an organic peroxide, and water. The surfactant that has a surface tension of 55 mN/m or smaller enables production of an aqueous dispersion containing polyvinylidene fluoride with high productivity. The upper limit of the surface tension of the surfactant is preferably 54 mN/m, more preferably 53 mN/m, and still more preferably 50 mN/m. The lower limit of the surface tension of the surfactant is preferably 5 mN/m, more preferably 7 mN/m, and still more preferably 10 mN/m.

The surface tension can be determined with, for example, a surface tension meter.

The surfactant is preferably at least one of the surfactants represented by the following Formulae (1) to (3). The double-chain surfactants represented by Formulae (1) to (3) enable production of an aqueous dispersion that contains polyvinylidene fluoride with high productivity.

The surfactants represented by Formula (1):

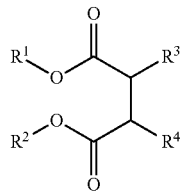

wherein $R^1$ and $R^2$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; $R^3$ represents H or —$(CH_2)_v$—$COOM^1$; $R^4$ represents —$SO_3M^2$ or —$(CH_2)_v$—$COOM^1$; v represents an integer of 0 to 3; $M^1$ and $M^2$ independently represent H, $NR_4$, or an alkali metal; and four Rs independently represent H or a C1 to C3 alkyl group.

The surfactants represented by Formula (2):

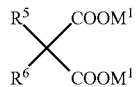

wherein $R^5$ and $R^6$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; two M's independently represent H, $NR_4$, or an alkali metal; and four Rs independently represent H or a C1 to C3 alkyl group.

The surfactants represented by Formula (3):

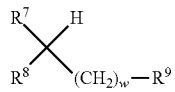

wherein $R^7$ and $R^8$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; $R^9$ represents —$SO_3M^2$ or —$COOM^1$; $M^1$ and $M^2$ independently represent H, $NR_4$, or an alkali metal; four Rs independently represent H or a C1 to C3 alkyl group; and w represents an integer of 0 to 3.

In Formula (2), $R^5$ and $R^6$ each may be a linear-chain or branched alkyl or halogenated alkyl group. Examples of the surfactant represented by Formula (2) include ammonium 2,2-dioctylmalonate.

In Formula (3), $R^7$ and $R^8$ each may be a linear-chain or branched alkyl or halogenated alkyl group. Examples of the surfactant represented by Formula (3) include sodium 9-heptadecanesulfonate.

The organic peroxide is used as a polymerization initiator. If VDF is polymerized at high temperatures using a polymerization initiator other than organic peroxide, for example, a persulfate, a gelled product is obtained, and the aqueous dispersion is not obtained accordingly. Additionally, the resultant PVDF is colored by heating, thus is unusable at high temperatures.

Examples of the organic peroxide include dialkylperoxides such as di-t-butylperoxide, di-t-hexylperoxide, 2,5-dimethyl-2,5-di(t-butylperoxy)hexane, and 2,5-dimethyl-2,5-di(t-butylperoxy)hexyne-3; hydroperoxides such as 1,1,3,3-tetramethylbutylhydroperoxide and t-butylhydroperoxide; diacylperoxides such as isobutylperoxidem 3,5,5-trimethylhexanoylperoxide, octanoylperoxide, lauroylperoxide, stearoylperoxide, succinic acid peroxide, and bis(ω-hydrododecafluoroheptanoyl)peroxide; peroxydicarbonates such as dinormalpropyl peroxydicarbonate, diisopropyl peroxydicarbonate, bis(4-t-butylcyclohexyl)peroxydicarbonate, di-2-ethoxyethyl peroxydicarbonate, di-2-ethylhexyl peroxydicarbonate, di-2-methoxybutyl peroxydicarbonate, and diethyl peroxydicarbonate; and peroxyesters such as 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethyl peroxy-2-ethylhexanoate, t-hexyl peroxy-2-ethylhexanoate, t-butyl peroxy-2-ethylhexanoate, t-butyl peroxyisobutyrate, t-hexyl peroxyisopropylmonocarbonate, t-butyl peroxy-3,5,5-trimethylhexanoate, t-butyl peroxylaurate, t-butyl peroxyisopropylmonocarbonate, t-butyl peroxy-2-ethylhexylmonocarbonate, and t-butyl peroxyacetate.

The organic peroxide is preferably at least one selected from the group consisting of di-t-butylperoxide, dinormalpropyl peroxydicarbonate, di-t-hexylperoxide, 2,5-dimethyl-2,5-di(t-butylperoxy)hexane, 2,5-dimethyl-2,5-di(t-butylperoxy)hexyne-3, and t-butyl peroxyisobutyrate because it enables production of a polymer that is less likely to foam even if heated.

As needed, the organic peroxide may be used in combination with a reducing agent such as Rongalite, ascorbic acid, tartaric acid, sodium disulfite, isoascorbic acid, and iron (II) sulfate.

The amount of the organic peroxide is preferably 1 to 10,000 ppm based on water, and more preferably 300 to 3,500 ppm. Each of these values is the amount of organic peroxide present at the beginning of the polymerization. The organic peroxide may be further added after the start of the polymerization.

Use of any of the surfactants represented by Formulae (1) to (3) is also important to achieve emulsion polymerization at high temperatures. For example, if ammonium perfluorohexanoate and a reactive compound are used as taught in Patent Literature 3, a PVDF aqueous dispersion having excellent dispersion stability will not be obtained.

The amount of the surfactants represented by Formulae (1) to (3) is preferably 10 to 30,000 ppm based on water, and more preferably 50 to 10,000 ppm.

Polymerization in the presence of any of the surfactants represented by Formulae (1) to (3) and the organic peroxide enables emulsion polymerization at high temperatures. This not only improves the productivity, but also allows the resultant PVDF to have a desired crystallinity and a desired melting point.

The surfactant is more preferably a surfactant represented by Formula (4):

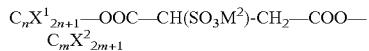

wherein n and m independently represent an integer of 3 to 10; $X^1$ and $X^2$ independently represent H, F, Cl, Br, or I; $M^2$ represents H, $NR_4$, or an alkali metal; and four Rs independently represent H or a C1 to C3 alkyl group.

M, $M^1$, and $M^2$ are independently H, $NR_4$, an alkali metal. Four Rs independently represent H or a C1 to C3 alkyl group. Preferably, at least one of the four Rs is H. The alkyl group is preferably a methyl group. M, $M^1$, and $M^2$ are each preferably H, $NH_4$, Na, or Li, and more preferably $NH_4$, Na, or Li.

The amount of the surfactant represented by Formula (4) is preferably 10 to 30,000 ppm based on water, and more preferably 50 to 10,000 ppm.

The polymerization can be performed as follows. Specifically, a polymerization vessel is charged with water, the surfactant, and the monomers such as VDF, and then the organic peroxide is added thereto. The monomers can be polymerized under stirring. The polymerization time may be 1 to 30 hours. The emulsion polymerization pressure is preferably 0.5 to 5.0 MPa, and more preferably 1.0 to 4.5 MPa.

The emulsion polymerization temperature may be changed in accordance with desired properties of the polymer by selecting an appropriate initiator. The emulsion polymerization temperature may be 10° C. to 200° C.

In the production method of the present invention, a molecular weight regulator or any other additive may be added. The molecular weight regulator may be added at one time in the beginning of the polymerization, or may be added continuously or intermittently.

Examples of the molecular weight regulator include esters such as dimethyl malonate, diethyl malonate, methyl acetate, ethyl acetate, butyl acetate, and dimethyl succinate, isopentane, isopropanol, acetone, mercaptans, carbon tetrachloride, cyclohexane, monoiodomethane, 1-iodomethane, 1-iodopropane, isopropyl iodide, diiodomethane, 1,2-diiodomethane, and 1,3-diiodopropane.

Other additives, such as a buffer, may be appropriately added. The amount of such additives is preferably within a range that does not impair the effects of the present invention.

Examples of the buffer include inorganic salts such as sodium carbonate, sodium bicarbonate, sodium orthophosphate, primary sodium phosphate, sodium chloride, sodium sulfate, sodium acetate, sodium citrate, boric acid-sodium hydroxide, boric acid-sodium carbonate, and potassium dihydrogenphosphate-sodium hydroxide.

Paraffin may be added to reduce sticking of the resultant polymer to the polymerization vessel.

Another aspect of the present invention is a PVDF aqueous dispersion that contains at least one surfactant selected from the group consisting of the surfactants represented by Formulae (1) to (3), water, and PVDF. The PVDF aqueous dispersion of the present invention can be suitably produced by the production method of the present invention.

The PVDF includes VDF units derived from VDF and has a functional group derived from an organic peroxide at a main chain end. The polymer chain of the PVDF is preferably consists only of the VDF units derived from VDF.

Examples of the functional group derived from an organic peroxide include $CH_3-CH_2-CF_2-CF_2-$, $CH_3-CF_2-CH_2-CF_2-$, $C(CH_3)_3-CF_2-CH_2-CF_2-$, and $C(CH_3)_3-CH_2-CF_2-$. The kind of the functional group present at a main chain end can be identified by $^1$H-NMR.

The surfactant and the organic peroxide are as described in connection with the production method of the present invention.

The PVDF in the aqueous dispersion preferably has an average particle size of 40 to 1,000 nm, more preferably 50 nm or larger, still more preferably 100 nm or larger, and particularly preferably 150 nm or larger, whereas more preferably 800 nm or smaller, and still more preferably 600 nm or smaller. The average particle size can be determined with Microtrac UPA from Honeywell International Inc.

The melt flow rate (MFR) of the PVDF in the aqueous dispersion may be 0 to 100 g/10 min, though it depends on the application. In coating material applications, the MFR is preferably 0 to 10 g/10 min, and more preferably 0.5 to 5 g/10 min. In water treatment applications, the PVDF preferably has a molecular weight of 200,000 or larger, and more preferably 200,000 to 1,000,000. The MFR is a value determined using PVDF fine powder obtained from the aqueous solution in accordance with ASTM D1238 at a temperature of 230° C. and a load of 10 kg. The molecular weight is a value determined by GPC.

The PVDF in the aqueous dispersion preferably has a melting point of 120° C. to 185° C. The melting point is more preferably 160° C. or higher, and more preferably 180° C. or lower. The melting point can be determined with a differential scanning calorimeter [DSC].

The solids concentration of the PVDF is preferably 3 to 50% by mass based on the PVDF aqueous dispersion, and more preferably 5 to 40% by mass. The solids concentration (P) is determined according to the formula $P=Z/X\times100(\%)$ where X represents the amount of a sample (=about 1 g) and Z represents a heating residue (Z) that is obtained by placing the sample in an aluminum cup having a diameter of 5 cm and drying the sample for one hour at 150° C.

The amount of the surfactant is preferably 10 to 10,000 ppm based on the PVDF aqueous dispersion, and more preferably 30 to 3,000 ppm.

The PVDF fine powder can be obtained from the PVDF aqueous dispersion of the present invention. The PVDF aqueous dispersion of the present invention and the PVDF fine powder will be suitably used in, for example, coating materials, lining materials, sheets, films, pipes, joints, valves, pumps, round bars, thick plates, bolts, nuts, insulating materials, electric wire coverings, piezoelectrics, pyroelectrics, fish line, binders for electrodes of cells, membranes for water treatments, architectural materials, and materials for oil drilling. Yet another aspect of the present invention is a coating material obtained from the PVDF aqueous dispersion of the present invention.

The PVDF aqueous dispersion of the present invention and the PVDF fine powder will be suitably used as coating materials or lining materials to be applied to the innermost or outermost surfaces of riser pipes and metallic pipes that are designed for transportation of a fluid such as crude oil or natural gas for use in or on the ground or on the seabed. Yet another aspect of the present invention is a coated product that includes a coating film obtained from the PVDF aqueous dispersion of the present invention. Coating or lining of the innermost surface is performed to form a coating film to shield carbon dioxide and hydrogen sulfide in crude oil and natural gas, which cause corrosion of the metallic pipe, so as to prevent corrosion of the metallic pipe and also to reduce fluid friction of hyperviscous crude oil. Similarly, the coating film on the outermost surface is formed to prevent corrosion caused by sea water, acid water, or the like. In the case lining or coating the innermost or outermost surface, the fluororesin may be filled with glass fiber, carbon fiber, aramid resin, mica, silica, talc, celite, clay, titanium oxide, or the like in order to further improve the rigidity and strength of the fluororesin of the present invention. In order to ensure the adhesion to the metal, an adhesive may be used, or alternatively the metal surface may be roughened.

Additionally, the PVDF aqueous dispersion of the present invention and the PVDF fine powder will be suitably used as molding materials for the following molded articles.

Examples of the molded articles include food packaging films, lining materials, packing members, sealing materials and sheets for use in fluid transfer lines in food manufacturing steps and other fluid transfer members for food manufacturing apparatuses;

bottle stoppers and packaging films for chemicals and drugs, lining materials, packing members, sealing materials, sheets and other liquid chemicals and drugs transfer members for use in fluid transfer lines in chemicals or drugs manufacturing steps;

lining materials for the inner surfaces of liquid chemical tanks and pipes in chemical plants and semiconductor fabrication plants;

O (square) rings, tubes, packing, valve cores, hoses, sealing materials, and the like for use in automotive fuel systems and peripheral equipment, and hoses, sealing materials and other fuel transfer members for use in automotive AT gears;

carburetor flange gaskets, shaft seals, valve stem seals, sealing materials, hoses, and the like for use in automotive engines and peripheral equipment, automotive brake hoses, air conditioner hoses, radiator hoses, electric wire coverings, and other automotive parts;

O (square) rings, tubes, packing members, valve cores, hoses, sealing materials, rolls, gaskets, diaphragms, joints and other members for transferring liquid chemicals for semiconductor manufacturing, which are to be used in semiconductor manufacturing equipment;

painting rolls, hoses, tubes, ink containers and other painting/inking members for paints and inks to be used in painting/coating equipment;

food and drink tubes or food and drink hoses and the like tubes, hoses, belts, packing members, joints, and other food and drink transfer members, food packaging materials, and glass cookware;

tubes, hoses, and other waste liquid transfer members for waste liquid transfer;

tubes, hoses, and other high-temperature liquid transfer members for high-temperature liquid transfer;

tubes, hoses, and other steam piping system members for steam piping;

tapes to be wound around pipes on ship decks and other corrosion preventing tapes for piping systems;

electric wire coverings, optical fiber coverings, transparent surface coverings to be provided on photovoltaic devices on the light-incident surface in solar cells, back surface members, and other various coverings;

diaphragms of diaphragm pumps, various packing members and other sliding members;

films for agricultural use, weather resistant coverings for various roofing materials, side walls, and so forth;

interior finishing materials for use in the field of building/construction, coating or covering materials for glass species such as nonflammable fireproof safety glass; and lining materials for laminated steel sheets used in household electric appliances.

More specific examples of the fuel transfer members for use in automotive fuel systems further include fuel hoses, filler hoses, and evaporator hoses. Such fuel transfer members can also be used as fuel transfer members for and resistant to sour gasoline, alcoholic fuels, and fuels containing such gasoline additive(s) as methyl tert-butyl ether and/or an amine.

The above-mentioned stoppers and packaging films for chemicals and drugs have good resistance to chemicals, such as acids. The above-mentioned liquid drug transfer members may be anticorrosive tapes to be wound around pipes in chemical plants.

Other examples of the molded articles include automotive radiator tanks, tanks for liquid chemicals, bellows, spacers, rollers, gasoline tanks, containers for transferring waste liquids, containers for transferring high-temperature liquids, and tanks for use in fishery and pisciculture.

Still other examples of the molded articles include automotive bumpers, door trims, instrument panels, food processing apparatuses, cooking utensils, water-repellent and oil-repellent glass species, illumination-related devices and apparatuses, display panels and housings for OA apparatuses, decorative illumination type sign boards, displays, liquid crystal displays, cellular phones, printed circuit boards, electric/electronic parts, miscellaneous goods, trash cans, bathtubs, unit baths, ventilation fans, and lighting apparatus frames.

EXAMPLES

The present invention is described below with reference to examples. The present invention is not limited to these examples.

Parameters in the examples were determined by the following methods.

Surface Tension

The surface tension was determined using a surface tension meter SURFACE CBVP-A3 available from Kyowa Interface Science Co., Ltd. and an aqueous solution (1000 ppm) prepared by mixing only water and the surfactant.

NMR Analysis

The analysis was performed with the following device under the following conditions.

NMR measurement device: a product of VARIAN Inc.
$^1$H-NMR measurement condition: 400 MHz (tetramethylsilane =0 ppm)
$^{19}$F-NMR measurment condition: 376 MHz (trichlorofluoromethane =0 ppm)

Determination of Abnormal Bonding Ratio

The abnormal bonding ratio was determined by $^{19}$F-NMR. Specifically, the value was calculated according to the following equation using the sum (=n2) of the areas of peaks around −114 to 117 ppm (derived from abnormal bonding) and the area (=n1) of the peak around −90 to −96 ppm (derived from —$CF_2$—$CH_2$—).

$$\text{Abnormal bonding ratio}(\%)=[n2/(n1+n2)]\times 100/2$$

Melting Point

The melting point was determined with a differential scanning calorimeter (DSC822e available from Mettler-Toledo Inc.).

70° C. to 220° C. RATE 20° C./min 1st run 1st down 2nd run

Crystallinity (Xc)

X-ray diffraction was performed with an X-ray diffraction apparatus (RINT2000 available from Rigaku Corp.). On the basis of the obtained X-ray diffraction patterns, the area (X) of a peak at 2θ (deg)=8 to 25, the area (Y) of a peak at 2θ=16 to 19, and the area (Z) of a peak at 2θ=19 to 21.5 were determined. The crystallinity was calculated according to the following equation using the obtained values X, Y, and Z.

$$Xc=(Y+Z)/X$$

Average Particle Size

The average particle size was determined with Microtrac UPA available from Honeywell International Inc.

Solids Concentration (P) of PVDF

The solids concentration (P) was determined according to the formula P=Z/X×100(%) where X represents the amount of a sample (=about 1 g) and Z represents a heating residue (Z) that is obtained by placing the sample in an aluminum cup having a diameter of 5 cm and drying the sample for one hour at 150° C.

Example 1

A 3.0-L stainless steel autoclave was charged with 1700 g of pure water, 0.85 g (500 ppm based on water as a polymerization medium) of H—(CF$_2$CF$_2$)$_3$—CH$_2$—O—CO—CH$_2$CH(—SO$_3$Na)—CO—O—CH$_2$—(CF$_2$CF$_2$)$_3$—H (surface tension: 22 mN/m), and 17 g of paraffin and then purged with nitrogen. Thereafter, 150 g of vinylidene fluoride (VDF) was added, and the inside of the vessel was heated to 115° C. Under stirring, 0.51 g of acetone and 5.6 g of di-t-butylperoxide were added to the mixture, whereby the reaction was started. To maintain the inside of the vessel at 4.0 MPa, 427 g of vinylidene fluoride was further added over 9 hours. In the middle of the reaction, 1.45 g (850 ppm based on water as a polymerization medium) of H—(CF$_2$CF$_2$)$_3$—CH$_2$—O—CO—CH$_2$CH(—SO$_3$Na)—CO—O—CH$_2$—(CF$_2$CF$_2$)$_3$—H was added. Thus, 2112.45 g of a stable PVDF emulsion (solids concentration: 20.6% by mass) was obtained. The obtained PVDF emulsion was subjected to a stability test by the following method. The results are shown in Table 1.

The obtained polymer had a melting point of 160.8° C., an average particle size of 171 nm, an abnormal bonding ratio of 5.5 mol %, and a crystallinity of 0.28.

The $^1$H-NMR (270 MHz, DMF-d7) results were as follows: polymer end: 1.885 ppm (C*H$_3$CH$_2$—CF$_2$); 3.634 ppm (C*H$_3$—O); 6.577 ppm (*HCF$_2$—CH$_3$).

Example 2

A 3.0-L stainless steel autoclave was charged with 1700 g of pure water, 0.85 g (500 ppm based on water as a polymerization medium) of H—(CF$_2$CF$_2$)$_3$—CH$_2$—O—CO—CH$_2$CH(—SO$_3$Na)—CO—O—CH$_2$—(CF$_2$CF$_2$)$_3$—H (surface tension: 21 mN/m), and 17 g of paraffin and then purged with nitrogen. Thereafter, 150 g of vinylidene fluoride (VDF) was added, and the inside of the vessel was heated to 115° C. Under stirring, 0.51 g of acetone and 5.6 g of di-t-butylperoxide were added to the mixture, whereby the reaction was started. To maintain the inside of the vessel at 4.0 MPa, 732 g of vinylidene fluoride was further added over 15.2 hours. In the middle of the reaction, 1.45 g (850 ppm based on water as a polymerization medium) of H—(CF$_2$CF$_2$)$_3$—CH$_2$—O—CO—CH$_2$CH(—SO$_3$Na)—CO—O—CH$_2$—(CF$_2$CF$_2$)$_3$—H and 0.34 g of acetone were added. Thus, 2311.49 g of a stable PVDF emulsion (solids concentration: 30.7% by mass) was obtained. The obtained PVDF emulsion was subjected to a stability test by the following method. The results are shown in Table 1.

The obtained polymer had a melting point of 162.03° C., an average particle size of 185 nm, an abnormal bonding ratio of 5.6 mol %, and a crystallinity of 0.33.

The $^1$H-NMR (270 MHz, DMF-d7) results were as follows: polymer end: 1.988 ppm (C*H$_3$CH$_2$—CF$_2$); 3.646 ppm (C*H$_3$—O); 6.568 ppm (*HCF$_2$—CH$_3$).

Example 3

A 3.0-L stainless steel autoclave was charged with 1700 g of pure water, 0.85 g (500 ppm based on water as a polymerization medium) of H—(CF$_2$CF$_2$)$_3$—CH$_2$—O—CO—CH$_2$CH(—SO$_3$Na)—CO—O—CH$_2$—(CF$_2$CF$_2$)$_3$—H (surface tension: 22 mN/m), and 17 g of paraffin and then purged with nitrogen. Thereafter, 150 g of vinylidene fluoride (VDF) was added, and the inside of the vessel was heated to 115° C. Under stirring, 0.51 g of acetone and 5.6 g of di-t-butylperoxide were added to the mixture, whereby the reaction was started. To maintain the inside of the vessel at 4.0 MPa, 425 g of vinylidene fluoride was further added over 15.2 hours. Thus, 2020 g of a stable PVDF emulsion (solids concentration: 20.1% by mass) was obtained. The obtained PVDF emulsion was subjected to a stability test by the following method. The results are shown in Table 1.

The obtained polymer had a melting point of 161° C., an average particle size of 206 nm, an abnormal bonding ratio of 5.6 mol %, and a crystallinity of 0.34.

The $^1$H-NMR (270 MHz, DMF-d7) results were as follows: polymer end: 1.988 ppm (C*H$_3$CH$_2$—CF$_2$); 3.636 ppm (C*H$_3$—O); 6.577 ppm (*HCF$_2$—CH$_3$).

Example 4

A 3.0-L stainless steel autoclave was charged with 1700 g of pure water, 0.51 g (300 ppm based on water as a polymerization medium) of F—(CF$_2$CF$_2$)$_3$—CH$_2$—CH$_2$—O—CO—CH$_2$CH(—SO$_3$Na)—CO—O—CH$_2$—CH$_2$—(CF$_2$CF$_2$)$_3$—F (surface tension: 24 mN/m), and 17 g of paraffin and then purged with nitrogen. Thereafter, 150 g of vinylidene fluoride (VDF) was added, and the inside of the vessel was heated to 115° C. Under stirring, 0.51 g of acetone and 2.8 g of di-t-butylperoxide were added to the mixture, whereby the reaction was started. The mixture was heated and stirred while the inside of the vessel was maintained at 4.0 MPa. Thus, 1728.18 g of a stable PVDF emulsion (solids concentration: 2.7% by mass) was obtained. The obtained PVDF emulsion was subjected to a stability test by the following method. The results are shown in Table 1.

The obtained polymer had a melting point of 161° C., an average particle size of 50 nm, an abnormal bonding ratio of 5.5 mol %, and a crystallinity of 0.34.

The $^1$H-NMR (270 MHz, DMF-d7) results were as follows: polymer end: 1.986 ppm (C*H$_3$CH$_2$—CF$_2$); 3.658 ppm (C*H$_3$—O); 6.572 ppm (*HCF$_2$—CH$_3$).

Example 5

A 3.0-L stainless steel autoclave was charged with 1700 g of pure water, 0.85 g of CF$_3$—CHF—CF$_2$—CH$_2$—O—CO—CH$_2$CH(—SO$_3$Na)—CO—O—CH$_2$—CF$_2$—CHF—CF$_3$ (surface tension 54 mN/m), and 17 g of paraffin and then purged with nitrogen. Thereafter, 150 g of vinylidene fluoride (VDF) was added, and the inside of the vessel was heated to 115° C. Under stirring, 5.6 g of di-t-butylperoxide was added to the mixture, whereby the reaction was started. Four hours later, 1758 g of a stable PVDF emulsion (solids concentration: 4.8% by mass) was obtained. The obtained PVDF emulsion was subjected to a stability test by the following method. The results are shown in Table 1.

The obtained polymer had a melting point of 161° C., an average particle size of 200 nm, an abnormal bonding ratio of 5.4 mol %, and a crystallinity of 0.35.

The $^1$H-NMR (270 MHz, DMF-d7) results were as follows: polymer end: 1.9 ppm (C*H$_3$CH$_2$—CF$_2$); 3.6 ppm (C*H$_3$—O); 6.6 ppm (*HCF$_2$—CH$_3$).

Example 6

A 3.0-L stainless steel autoclave was charged with 1400 g of pure water and 0.88 g of sodium di-2-ethylhexylsulfosuccinate (surface tension: 45 mN/m) and then purged with nitrogen. Thereafter, 198 g of vinylidene fluoride (VDF) was added, and the inside of the vessel was heated to 80° C. Under stirring, 1.1 g of dinormalpropyl peroxydicarbonate was added to the mixture, whereby the reaction was started. Thirty minutes later, 1.1 g of dinormalpropyl peroxydicarbonate was further added, and 1.5 hours later, 1399 g of a stable PVDF emulsion (solids concentration: 3.1% by mass) was obtained. The obtained PVDF emulsion was subjected to a stability test by the following method. The results are shown in Table 1.

The obtained polymer had a melting point of 168° C., an average particle size of 111 nm, an abnormal bonding ratio of 5.1 mol %, and a crystallinity of 0.37.

The $^1$H-NMR (270 MHz, DMF-d7) results were as follows: polymer end: 1.1 ppm (C*H$_3$CH$_2$CH$_2$—O—CO—O—CF$_2$CH$_2$); 1.9 ppm (CH$_3$C*H$_2$CH$_2$—O—CO—O—CF$_2$CH$_2$); 2.0 ppm (C*H$_3$CH$_2$—CF$_2$); 4.3 ppm (CH$_3$CH$_2$C*H$_2$—O—CO—O—CH$_2$CF$_2$); 4.7 ppm (CH$_3$CH$_2$CH$_2$—O—CO—O—C*H$_2$CF$_2$).

Example 7

A 3.0-L stainless steel autoclave was charged with 1700 g of pure water, 0.85 g of H—(CF$_2$CF$_2$)$_3$—CH$_2$—O—CO—CH$_2$CH(—SO$_3$Na)—CO—O—CH$_2$—(CF$_2$CF$_2$)$_3$—H (surface tension: 54 mN/m), and 17 g of paraffin and then purged with nitrogen. Thereafter, 150 g of vinylidene fluoride (VDF) was added, and the inside of the vessel was heated to 80° C. Under stirring, 5.6 g of t-butyl peroxyisobutyrate was added to the mixture, whereby the reaction was started. Two hours later, 1730 g of a stable PVDF emulsion (solids concentration: 4.5% by mass) was obtained. The obtained PVDF emulsion was subjected to a stability test by the following method. The results are shown in Table 1.

The obtained polymer had a melting point of 167° C., an average particle size of 98 nm, an abnormal bonding ratio of 5.1 mol %, and a crystallinity of 0.36.

The $^1$H-NMR (270 MHz, DMF-d7) results were as follows: polymer end: 1.9 ppm (C*H$_3$CH$_2$—CF$_2$); 3.6 ppm (C*H$_3$—O); 6.6 ppm (*HCF$_2$—CH$_3$).

Example 8

A 3.0-L stainless steel autoclave was charged with 2000 g of pure water, 4 g of H—(CF$_2$CF$_2$)$_3$—CH$_2$—O—CO—CH(CH$_2$COONH$_4$)CH(CH$_2$COONH$_4$)—CO—O—CH$_2$—(CF$_2$CF$_2$)$_3$—H (surface tension: 28 mN/m), and 20 g of paraffin and then purged with nitrogen. Thereafter, 111 g of vinylidene fluoride (VDF) was added, and the inside of the vessel was heated to 125° C. Under stirring, 6.6 g of di-t-butylperoxide was added to the mixture, whereby the reaction was started. To maintain the inside of the vessel at 4.0 MPa, 147 g of vinylidene fluoride was further added over 3 hours. Thus, 2100 g of a stable PVDF emulsion (solids concentration: 6.5% by mass) was obtained. The obtained PVDF emulsion was subjected to a stability test by the following method. The results are shown in Table 1.

The obtained polymer had a melting point of 158.8° C., an average particle size of 390 nm, an abnormal bonding ratio of 5.6 mol %, and a crystallinity of 0.30.

The $^1$H-NMR (270 MHz, DMF-d7) results were as follows: polymer end: 1.8 ppm (C*H$_3$CH$_2$—CF$_2$); 3.6 ppm (C*H$_3$—O); 6.5 ppm (*HCF$_2$—CH$_3$).

Example 9

A 3.0-L stainless steel autoclave was charged with 1700 g of pure water, 3 g of CH$_3$(CH$_2$)$_m$—CH(—SO$_3$Na)(CH$_2$)$_n$—CH$_3$ (Hostapur SAS93, available from Clariant) (surface tension: 30 mN/m), and 17 g of paraffin and then purged with nitrogen. Thereafter, 150 g of Vinylidene fluoride (VDF) was added, and the inside of the vessel was heated to 125° C. Under stirring, 5.6 g of di-t-butyl peroxyisobutyrate was added to the mixture, whereby the reaction was started. Two hours later, 1735 g of a stable PVDF emulsion (solids concentration: 4.0% by mass) was obtained. The obtained PVDF emulsion was subjected to a stability test by the following method. The results are shown in Table 1.

The obtained polymer had a melting point of 156° C., an average particle size of 105 nm, an abnormal bonding ratio of 5.6 mol %, and a crystallinity of 0.33.

The $^1$H-NMR (270 MHz, DMF-d7) results were as follows: polymer end: 1.9 ppm (C*H$_3$CH$_2$—CF$_2$); 3.6 ppm (C*H$_3$—O); 6.6 ppm (*HCF$_2$—CH$_3$).

Example 10

A 3.0-L stainless steel autoclave was charged with 1700 g of pure water, 0.85 g of F(CF$_2$)$_4$—O—CF$_2$CF$_2$—O—CF$_2$—CH$_2$—O—CO—CH$_2$CH(—SO$_3$Na)—CO—O—CH$_2$—CF$_2$—O—CF$_2$CF$_2$—O—(CF$_2$)$_4$F (surface tension: 22 mN/m), and 17 g of paraffin and then purged with nitrogen. Thereafter, 150 g of vinylidene fluoride (VDF) was added, and the inside of the vessel was heated to 125° C. Under stirring, 5.6 g of di-t-butylperoxide was added to the mixture, whereby the reaction was started. 1.5 hours later, 1748 g of a stable PVDF emulsion (solids concentration: 4.0% by mass) was obtained. The obtained PVDF emulsion was subjected to a stability test by the following method. The results are shown in Table 1.

The obtained polymer had a melting point of 158° C., an average particle size of 102 nm, an abnormal bonding ratio of 5.6 mol %, and a crystallinity of 0.33.

The $^1$H-NMR (270 MHz, DMF-d7) results were as follows: polymer end: 2.0 ppm (C*H$_3$CH$_2$—CF$_2$); 3.6 ppm (C*H$_3$—O); 6.6 ppm (*HCF$_2$—CH$_3$).

Example 11

A 3.0-L stainless steel autoclave was charged with 2000 g of pure water, 4 g of CF$_3$(CF$_2$)$_3$—CH$_2$CH$_2$C(COONH$_4$)$_2$CH$_2$CH$_2$(CF$_2$)$_3$CF$_3$ (surface tension: 40 mN/m), and 20 g of paraffin and then purged with nitrogen. Thereafter, 111 g of vinylidene fluoride (VDF) was added, and the inside of the vessel was heated to 125° C. Under stirring, 6.6 g of di-t-butylperoxide was added to the mixture, whereby the reaction was started. To maintain the inside of the vessel at 4.0 MPa, 130 g of vinylidene fluoride was further added over 3 hours. Thus, 2085 g of a stable PVDF emulsion (solids concentration: 5.5% by mass) was obtained. The obtained PVDF emulsion was subjected to a stability test by the following method. The results are shown in Table 1.

The obtained polymer had a melting point of 158° C., an average particle size of 380 nm, an abnormal bonding ratio of 5.6 mol %, and a crystallinity of 0.31.

The $^1$H-NMR (270 MHz, DMF-d7) results were as follows: polymer end: 1.8 ppm ($C*H_3CH_2$—$CF_2$); 3.6 ppm ($C*H_3$—O); 6.5 ppm ($*HCF_2$—$CH_3$).

Comparative Example 1

A 3.0-L stainless steel autoclave was charged with 2560 g of pure water, 1.6 g of $CF_3$—$CF_2$—$CF_2$—$CF_2$—$CF_2$—$CF_2$—$CF_2$—$COONH_4$ (surface tension: 62 mN/m), and 4.2 g of di-t-butylperoxide and then purged with nitrogen. Thereafter, 64 g of vinylidene fluoride (VDF) was added, and the inside of the vessel was heated to 115° C. Five hours later, 2590 g of a PVDF emulsion (solids concentration: 2.4% by mass) was obtained. The obtained PVDF emulsion was subjected to a stability test by the following method. The results are shown in Table 1.

The obtained polymer had a melting point of 157° C., an average particle size of 199 nm, an abnormal bonding ratio of 6.1 mol %, and a crystallinity of 0.34.

The $^1$H-NMR (270 MHz, DMF-d7) results were as follows: polymer end: 1.9 ppm ($C*H_3CH_2$—$CF_2$); 3.55 ppm ($C*H_3$—O); 6.468 ppm ($*HCF_2$—$CH_3$).

Comparative Example 2

A 3.0-L stainless steel autoclave was charged with 1700 g of pure water, 17 g of paraffin, 1.1 g of $CF_3$—$CF_2$—$CF_2$—$CF_2$—$CF_2$—$CF_2$—$COONH_4$ (surface tension: 63 mN/m), and 2.7 g of di-t-butylperoxide and then purged with nitrogen. Thereafter, 130 g of vinylidene fluoride (VDF) was added, and the inside of the vessel was heated to 125° C. To maintain the inside of the vessel at 4.0 MPa, 301 g of vinylidene fluoride was further added over 3.5 hours. Thus, 1802 g of a PVDF emulsion (solids concentration: 12.9% by mass) was obtained. The obtained PVDF emulsion was subjected to a stability test by the following method. The results are shown in Table 1.

The obtained polymer had a melting point of 157° C., an average particle size of 518 nm, an abnormal bonding ratio of 6.2 mol %, and a crystallinity of 0.33.

The $^1$H-NMR (270 MHz, DMF-d7) results were as follows: polymer end: 1.9 ppm ($C*H_3CH_2$—$CF_2$); 3.5 ppm ($C*H_3$—O); 6.5 ppm ($*HCF_2$—$CH_3$).

Comparative Example 3

A 3.0-L stainless steel autoclave was charged with 2000 g of pure water, 8.3 g of $CF_3$—$CF_2$—$CF_2$—$CF_2$—$CF_2$—COOH (surface tension: 64 mN/m), and 4.2 g of di-t-butylperoxide and then purged with nitrogen. Thereafter, 172 g of vinylidene fluoride (VDF) was added, and the inside of the vessel was heated to 125° C. To maintain the inside of the vessel at 4.0 MPa, 90 g of vinylidene fluoride was further added over 4 hours. Thus, 1980 g of a PVDF emulsion (solids concentration: 4.6% by mass) and 78 g of a precipitated polymer was obtained. The obtained PVDF emulsion was subjected to a stability test by the following method. The results are shown in Table 1.

The obtained polymer had a melting point of 160° C., an average particle size of 597 nm, an abnormal bonding ratio of 6.0 mol %, and a crystallinity of 0.33.

The $^1$H-NMR (270 MHz, DMF-d7) results were as follows: polymer end: 1.885 ppm ($C*H_3CH_2$—$CF_2$); 3.546 ppm ($C*H_3$—O); 6.468 ppm ($*HCF_2$—$CH_3$).

Stability Test

To compare the stability of the emulsions, 1 L of each emulsion was allowed to stand for a certain period (one day and one month) at normal temperature (20° C.), and the state of the emulsions was observed.

TABLE 1

|  | Example 1 | Example 2 | Example 3 | Example 4 | Example 5 | Example 6 | Example 7 | Example 8 |
|---|---|---|---|---|---|---|---|---|
| One day later | No change | No change | No change | No change | No change | No change | No change | No change |
| One month later | No change | No change | No change | No change | No change | No change | No change | No change |

|  | Example 9 | Example 10 | Example 11 | Comparative Example 1 | Comparative Example 2 | Comparative Example 3 |
|---|---|---|---|---|---|---|
| One day later | No change | No change | No change | Polymer precipitated Redispersible | Polymer precipitated Redispersible | Polymer precipitated Redispersible |
| One month later | No change | No change | No change | Polymer precipitated Not redispersible | Polymer precipitated Not redispersible | Polymer precipitated Not redispersible |

Example 12

The emulsion obtained in Example 1 was coagulated and dried to prepare PVDF powder.

The obtained PVDF powder (7 g), PARALOIDB 44 (available from The Dow Chemical Company) (3 g), titanium oxide R960 (available from Du Pont) (6 g), and isophorone (24 g) were mixed to produce a coating material. The coating material was applied to an aluminum plate and baked at 240° C. for 15 minutes. Thus, a coated plate was obtained. The coated plate was evaluated for coating film properties in the following methods. Further, the coated plate was subjected to an exposure test in Okinawa prefecture for a year and showed a high gloss retention. The results are shown in Table 2.

Gloss

The gloss was determined with a gloss meter (VG7000 available from NIPPON DENSHOKU INDUSTIRES Co., Ltd.) at 60 degrees.

Hardness of Coating Film

The hardness was determined by pencil hardness test.

Dry Coating Film Adhesion

A hundred squares were formed with a cutter in a 1 cm square on the coating film in accordance with JIS K 5600-5-6:1999. Cellotape (registered trademark) (adhesive tape produced by Nichiban Co., Ltd.) was sufficiently stuck to the surface, and immediately peeled off. The coating film was evaluated as "o (good)" if no peeling of the coating film occurred.

Wet Coating Film Adhesion

After the test for the dry coating film adhesion, the coated plate was immersed in ion-exchanged water (38° C.) for 24 hours. Cellotape (registered trademark) (adhesive tape produced by Nichiban Co., Ltd.) was sufficiently stuck to the test surface, and immediately peeled off. The coating film was evaluated as "o (good)" if no peeling of the coating film occurred.

Boiling Water Adhesion

After the test for the dry coating film adhesion, the coated plate was immersed in boiling water (99° C.) for 20 minutes. Cellotape (registered trademark) (adhesive tape produced by Nichiban Co., Ltd.) was sufficiently stuck to the test surface, and immediately peeled off. The coating film was evaluated as "o (good)" if no peeling of the coating film occurred.

Chemical Resistance Test with Hydrochloric Acid

Ten drops of 10% hydrochloric acid were dropped on the coating film, and the coating film was allowed to stand for 10 minutes. Thereafter, the film was visually observed. The coating film was evaluated as "o (good)" if no change was observed.

Chemical Resistance Test with Nitric Acid

The coated plate was immersed in 70% nitric acid for 30 minutes and allowed to stand for 1 hour. Color difference (ΔE) between before and after the test was determined.

TABLE 2

|  |  | Example 12 |
|---|---|---|
| Coating film properties | Gloss (60 degrees) | 43.5 |
|  | Coating film hardness | 2H |
|  | Dry coating film adhesion | o |
|  | Wet coating film adhesion | o |
|  | Boiling water adhesion | o |
|  | Chemical resistance test with hydrochloric acid | o |
|  | Chemical resistance test with nitric acid (ΔE) | 0.27 |
| Exposure test | Gloss before exposure (60 degrees) | 32.1 |
|  | Gloss after 1-year exposure (60 degrees) | 31.5 (Gloss retention 98%) |

The invention claimed is:

1. A method of producing an aqueous dispersion of polyvinylidene fluoride, the method comprising:
   emulsion polymerization of vinylidene fluoride in the presence of a surfactant, an organic peroxide, and water to produce an aqueous dispersion that contains polyvinylidene fluoride,
   the surfactant having a surface tension of 21 mN/m or more and 55 mN/m or smaller when added to water in an amount of 1000 ppm,
   wherein the organic peroxide is at least one selected from the group consisting of di-t-butylperoxide, di-n-propyl peroxydicarbonate, di-t-hexylperoxide, 2,5-dimethyl-2,5-di(t-butylperoxy)hexane, 2,5-dimethyl-2,5-di(t-butylperoxy)hexyne-3, and t-butyl peroxyisobutyrate,
   wherein the surfactant is at least one selected from the group consisting of
   the surfactants represented by Formula (1):

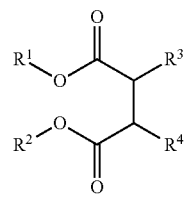

wherein $R^1$ and $R^2$ independently represent a C1 to C14 alkyl or halogenated alkyl group; at least one of $R^1$ and $R^2$ is a C1 to C14 halogenated alkyl group; the alkyl or halogenated alkyl group may contain an oxygen atom between carbon atoms if the alkyl or halogenated alkyl group contains 2 to 14 carbons; $R^3$ represents H or $-(CH_2)_v-COOM^1$; $R^4$ represents $-SO_3M^2$ or $-(CH_2)_v-COOM^1$; v represents an integer of 0 to 3; $M^1$ and $M^2$ independently represent H, $NR_4$ or an alkali metal; and four Rs independently represent H or a C1 to C3 alkyl group,
   the surfactants represented by Formula (2):

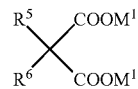

wherein $R^5$ and $R^6$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; two $M^1$s independently represent H, $NR_4$ or an alkali metal; and four Rs independently represent H or a C1 to C3 alkyl group, and
   the surfactants represented by Formula (3):

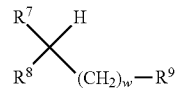

wherein $R^7$ and $R^8$ independently represent a C1 to C14 alkyl or halogenated alkyl group; the alkyl or halogenated alkyl group may contain an oxygen atom between carbon atoms if the alkyl or halogenated alkyl group contains 2 to 14 carbons; $R^9$ represents $-SO_3M^2$ or $-COOM^1$; $M^1$ and $M^2$ independently represent H, $NR_4$, or an alkali metal; four Rs independently represent H or a C1 to C3 alkyl group; and w represents an integer of 0 to 3.

2. The method according to claim 1,
   wherein vinylidene fluoride alone is emulsion polymerized.

3. The method according to claim 1,
   wherein the organic peroxide is at least one selected from the group consisting of di-t-butylperoxide, di-t-hexylperoxide, 2,5-dimethyl-2,5-di(t-butylperoxy)hexane, 2,5-dimethyl-2,5-di(t-butylperoxy)hexyne-3, and t-butyl peroxyisobutyrate.

* * * * *